United States Patent [19]

Kurahashi

[11] Patent Number: 4,491,863
[45] Date of Patent: Jan. 1, 1985

[54] COLOR DISPLAY APPARATUS

[75] Inventor: Koichiro Kurahashi, Hyogo, Japan

[73] Assignee: Mitsubishi Denki Kabushiki Kaisha, Tokyo, Japan

[21] Appl. No.: 212,378

[22] Filed: Dec. 3, 1980

[30] Foreign Application Priority Data

Dec. 4, 1979 [JP] Japan .................. 54-158814
Dec. 4, 1979 [JP] Japan .................. 54-158815

[51] Int. Cl.³ .............................................. H04N 9/16
[52] U.S. Cl. ...................................... 358/56; 358/64; 358/59
[58] Field of Search ................. 358/56, 59, 50, 52, 358/64, 212; 313/461, 470, 471, 472; 340/366 CA, 366 E

[56] References Cited

U.S. PATENT DOCUMENTS

| | | | |
|---|---|---|---|
| 3,456,069 | 7/1969 | Thurston | 358/56 |
| 3,624,273 | 11/1971 | Gale | 358/56 |
| 3,909,525 | 9/1975 | Fagan | 358/87 |
| 3,935,590 | 1/1976 | Kaji et al. | 358/56 |
| 3,961,365 | 6/1976 | Payne et al. | 358/56 |
| 4,047,203 | 9/1977 | Dillon | 358/44 |

FOREIGN PATENT DOCUMENTS

| | | | |
|---|---|---|---|
| 933287 | 9/1973 | Canada | 358/59 |
| 79434 | 7/1978 | Japan | 358/44 |

OTHER PUBLICATIONS

NHK Technical Monograph, No. 28: Mar. 1979, Gas--Discharge Panels for Color TV Display, pp. 3-46.
Diamond Vision, A Full-Color Outdoor Video-Display System, by Kikuji Yagishita, Mitsubishi Electric Advance, vol. 13, Sep. 1980, pp. (18-19).

*Primary Examiner*—Tommy P. Chin
*Attorney, Agent, or Firm*—Sughrue, Mion, Zinn, Macpeak, and Seas

[57] ABSTRACT

A color display device having a display surface constituted by a number of picture elements in which each picture element is made up of one red light emitting elements, two green light emitting elements and one blue light emitting element, to improve the resolution, color mixing and the maximum brightness of the display.

3 Claims, 7 Drawing Figures

COLOR DISPLAY APPARATUS

BACKGROUND OF THE INVENTION

The present invention relates to a large screen color image display apparatus having a large display area, for instance more than 30 m², the display surface of which is constructed by arranging a number of light emitting elements each of which emits light in one of three primary colors, red, green and blue (hereinafter "R", "G" and "B", respectively). More particularly, the invention relates to an arrangement of light emitting elements in which the resolution, color mixing, and brightness of the display surface are significantly improved.

Heretofore, in constructing a color image display apparatus, a large number of picture elements are provided with each picture element being made up of individual light emitting elements each of which emits light in one of three primary colors. Usually each picture element is constituted by arranging three light emitting elements, namely, a red light emitting element, a green light emitting element and a blue light emitting element, in combination.

However, in constructing a large screen color display apparatus using such light emitting elements, the spacing or pitch between the light emitting elements has a lower limit due to inherent structural requirements of the display surface and the light emitting elements themselves. Also, the total number of elements has an upper limit due to economic reasons. Accordingly, the conventional technique is not always satisfactory as to the quality of displayed image. For instance, the primary colors provided by the individual light emitting elements are often observable separately from one another and the brightness of the displayed image is often insufficient.

FIG. 1 shows conventional arrangement of light emitting elements for a display apparatus which produces what is considered the most excellent display quality among the previously known arrangements of light emitting elements. In FIG. 1, reference characters 1R, 1G and 1B designate light emitting elements of three primary colors red (R), green (G) and blue (B), respectively, and 2 the display surface of a large screen color display apparatus which is provided by arranging a number of light emitting elements. The light emitting elements are selected by column and row selecting lines (not shown) and are driven by corresponding video signals.

In FIG. 1, the light emitting elements in each row are arranged at a pitch of $P_0$ in the order of R, G, B, R, G, ..., so that the horizontal pitch of light emitting elements of the same color is $3P_0$. The same color light emitting elements in odd numbered rows and in even numbered rows as viewed vertically are shifted by $P_1 = 1.5P_0$ from one another. The pitch $P'_1$ of the rows is usually set to a value which is close to the value $P_1$. The following description assumes $P'_1 = P_1$.

It is well known that, in the case where the same color elements in adjacent rows are shifted as shown in FIG. 1, the equivalent sampling pitch of the displayed image in the horizontal direction can be regarded as the shortest element distance of the same color in the horizontal direction. In FIG. 1, the equivalent sampling pitch in the horizontal direction is $P_1 = 1.5P_0$.

Color video signals are sampled and applied to the light emitting elements corresponding to their positions so that they emit light at brightnesses corresponding to the signal amplitudes.

The above-described arrangement of the light emitting elements provides the following results:

(I) Resolution

The resolution of a displayed image is mainly governed by the equivalent sampling pitch of the green light emitting elements because the human eye is most sensitive to and is highest in resolution for light wavelengths around that of green light and is less sensitive to red and blue light. The red and blue light emitting elements, however, are necessary for color reproduction.

Because of the structural requirements of the display surface and the light emitting elements, the pitch of the light emitting elements has a lower limit. Let us consider the case where a display surface is constituted by light emitting elements arranged with the lower limit of $P_0$. In that case, with respect to the equivalent sampling pitch for determining the resolution of a displayed image, the horizontal or vertical pitch is $P_1 = 1.5P_0$ in the arrangement in FIG. 1.

(II) Color Mixing

For a display apparatus constructed with three primary color elements, if the density of the light emitting elements is not sufficiently high, the three primary colors are not sufficiently mixed, that is, the lights from the different light emitting elements are separately or individually observable, and the quality of the displayed color image is degraded. The low quality of displayed image due to color separation appears most significant in the edge portion of the image because of physiological properties of the human eye. FIG. 2 illustrates the observed image at the edge portion of the image. By way of example, let us consider the case where the edge of a white figure (such as a character) is positioned as shown in FIG. 2 wherein the left-hand side of the two-dot chain line is white and the right-hand side is black. As is clear from FIG. 2, the red (R) element on the end of the figure is spaced by about $1.5P_0$ from the green (G) element with which the light from the red element should be mixed. For improving the quality of the displayed image, it is desired to provide an arrangement having a shorter spacing between red (R) and green (G) light emitting elements at the edge portions of images. The same relation exists for the blue (B) and green (G) light emitting elements.

In the case where a thin white line is displayed horizontally, it is necessary to eliminate the chance that only blue or red light emitting elements at the end of the white line emit light. In order to meet this requirement, with the arrangement of FIG. 1, it is necessary for the line width to have a value equal to at least two rows of light emitting elements, that is, $1.5P_0$. This concept is applicable also to a line extending horizontally, and in the arrangement of FIG. 1, the line should have a width of at least $P_0$.

In general, most characters are constituted by vertical and horizontal segments. Therefore, in the case where the arrangement of FIG. 1 is used to display a thin character, there may be the cases where the primary colors are undesirably observable separately from one another at the end of the character.

(III) Brightness

Let us consider the case where cathode ray tubes (CRTs) are used for the light emitting elements.

By way of example, let us consider the maximum brightness which is obtainable in displaying "white". If, in the arrangement of FIG. 1, the total number of CRT elements is N, then the number of red, green or blue CRT elements is N/3. Therefore, utilizing the NTSC system, the brightness is:

$$Y_1 = (0.3I_R + 0.59I_G + 0.11I_B) \times N/3A$$

where A is the display area and $I_R$, $I_G$ and $I_B$ are the output luminous fluxes of the red, green and blue elements, respectively. "White" can be displayed with $I_R = I_G = I_B$. Therefore, the maximum brightness of "white" is determined by the lowest maximum of the output luminous fluxes $I_R$, $I_G$ and $I_B$. If the lowest is represented by $\hat{I}$, then the realizable maximum brightness of "white" is $\hat{Y}_1 = N\hat{I}/3A$.

As described below, with presently-available CRT technology, the maximum output luminous flux $\hat{I}_G$ is the lowest of the three in maximum output. Therefore, the maximum brightness of "white" in the arrangement of FIG. 1 is $Y_1 = N\hat{I}_G/3A$ with $\hat{I} = \hat{I}_G$. Accordingly, the maximum brightness of "white" in FIG. 1 is limited by $I_G$ so that, as a practical matter, a sufficiently high maximum brightness cannot be obtained.

SUMMARY OF THE INVENTION

Accordingly, an object of the present invention is to provide a color display apparatus which provides an improved resolution, improved color mixing, and higher maximum brightness compared with a conventional apparatus. This and other objects of the invention are met by a display apparatus constructed by arranging light emitting elements taking into account the visual response of the human eye and the light emission characteristics of the light emitting elements.

Specifically, this and other objects of the invention are met by a color display apparatus having a color display surface constituted by arranging a number of light emitting elements each of which emits light in one of the three primary colors, in which each picture element is made up of one red light emitting element, two green light emitting elements and one blue light emitting element.

The principle, nature and utility of the invention will become more apparent from the following detailed description when read in conjunction with the accompanying drawings.

DESCRIPTION OF THE PREFERRED EMBODIMENTS

Figure 4:
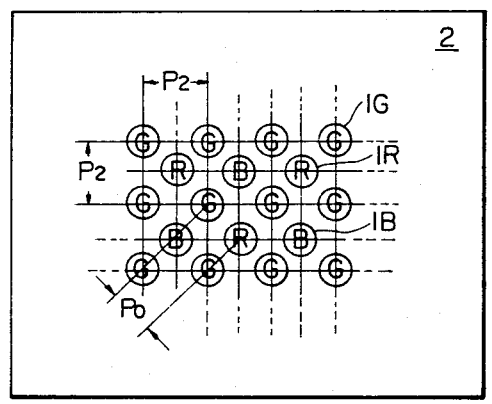
FIG. 4 is an explanatory diagram showing an example of the arrangement of CRT elements in a preferred embodiment of a color display apparatus according to the invention.

FIG. 4 shows an example of the arrangement of CRT elements in a preferred embodiment of the invention. As shown in FIG. 4, the green CRT elements are arranged in the form of a lattice at a pitch $P_2$ in both column and row directions while the red CRT elements and the blue CRT elements are alternately arranged at the centers of the lattice squares having the green CRT elements at their corners. The shortest pitch of the CRT elements in the arrangement of FIG. 4, which is in the oblique direction, is denoted by $P_0$.

Color video signals are sampled and applied to the CRT elements corresponding to their positions so that they emit light at brightness corresponding to the signal amplitudes and the desired image is displayed. However, it should be noted that control is so effected that the red and blue CRT elements emit light at a brightness twice that of the brightness in the conventional arrangement of FIG. 1.

The above-described arrangement of the CRT elements provides the advantageous practical effects which will be described by comparison with those of the conventional apparatus of FIG. 1.

(I) Resolution

The resolution of a displayed image is determined mainly by the pitch of green CRT elements because the resolving power of the human eye is highest in resolution for light around green light. The red and blue CRT elements carry out required color reproductions.

Because of the structural limitations of the display surface and the CRT elements, the pitch of the CRT elements has a lower limit. Let us consider the case where a display surface is constituted by arranging CRT elements with the pitch which is the lower limit as $P_0$. With respect to the equivalent sampling pitch which determines the resolution of a displayed image, the horizontal and vertical pitch is $P_1 = 1.5P_0$ for the arrangement of FIG. 1 as described previously, while $P_2 = \sqrt{2}P_0$ for the arrangement of FIG. 4 as determined by the shortest pitch of the green CRT elements in the horizontal and vertical directions. That is, $P_1$ is approximately equal to $P_2$. However, the pitch in the oblique direction of the image is $1.5 \times \sqrt{2}P_0$ for FIG. 1 and $P_0$ for FIG. 4. Accordingly, the arrangement of FIG. 4 produces a significantly improved image having higher resolution than that of FIG. 1.

(II) Color Mixing

Figure 5:
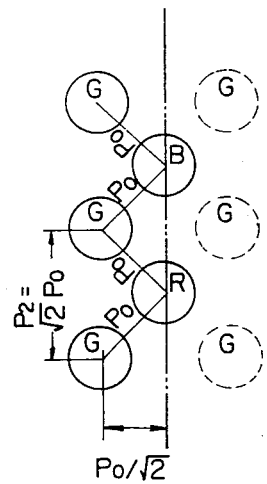
FIG. 5 is an explanatory diagram showing one end of an image displayed on the color display apparatus of FIG. 4.

FIG. 5 is a diagram illustrating the state of display at the edge of an image in a color display apparatus constructed according to the invention. By way of example, let us consider the case where the edge of a white figure such as a character is positioned as shown in FIG. 5 in which the left-hand side of the two-dot chain line is white and the right-hand side is black. In the case of FIG. 1, the red CRT element at the end of the figure is spaced by about $1.5P_0$ from the green CRT element with the ilght of which the light from the red CRT element is to be mixed as mentioned previously with respect to FIG. 2, while it is spaced by $P_0$ in the case of FIG. 5. This is the same for the blue CRT element. Thus, color mixing occurs more readily in the arrangement of FIG. 4 than with the arrangement of FIG. 1 thus improving the quality of the displayed image even at the edge portion thereof.

Figure 6:
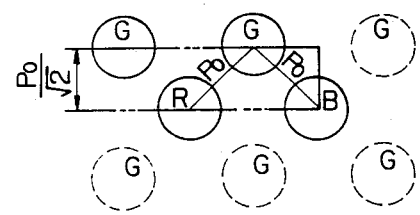
FIG. 6 is an explanatory diagram showing a thin line displayed on the color display apparatus of FIG. 4.

In the case where a thin white line is to be displayed horizontally, it is necessary to eliminate the possibility of the red or blue CRT elements at the end of the white line emitting light solely, as was described before. In order to meet this requirement, in the arrangement of FIG. 1 the line width should cover at least two rows of CRT elements, that is, the line width should be at least $1.5P_0$ as described above. However, in the arrangement of FIG. 4 it is merely $P_0/\sqrt{2}$ as is clear from FIG. 6. This is applicable also to a line image extending vertically. That is, in the arrangement of FIG. 1, the line width should be at least $1.5P_0$ while in the arrangement of FIG. 4 it needs only $P_0/\sqrt{2}$.

In general, most of the characters are constituted by vertical and horizontal segments. Therefore, the arrangement of FIG. 4 is advantageous in that thinner characters can be displayed with the separation of primary colors at the edges minimized.

(III) Brightness

By way of example, let us consider the maximum brightness which is obtained in displaying "white", If the total number of CRT elements is represented by N and the display area is represented by A, then the numbers of red, green and blue CRT elements are N/4, N/2 and N/4, respectively. Therefore, the brightness of the display is given by: $Y_2 = (0.3I_R/4 + 0.59I_G/2 + 0.11I_B/4) \times N/A$. "White" can be displayed with $I_R = 2I_G = I_B$.

If the lower in maximum output of $I_R$ and $I_B$ is represented by $\hat{I}$, then when $\hat{I} < 2\hat{I}_G$, the maximum brightness of "white" is determined by $\hat{I}$ such that: $\hat{Y}_2 = N\hat{I}/4A$. When $\hat{I} \geq 2\hat{I}_G$, $\hat{Y}_2 = N\hat{I}_G/2A$.

As described below, for presently available CRT technology, $I_G$ has the lowest maximum output. Therefore, the maximum brightness of "white" in the arrangement of FIG. 1 is $\hat{Y}_1 = N\hat{I}_G/3A$ with $\hat{I} = \hat{I}_G$ as described above. Thus, it can be understood that, in the case where the maximum brightness of "white" $\hat{Y}_1$ with FIG. 1 is compared with the maximum brightnesses $\hat{Y}_2$ or $\hat{Y}'_2$ obtainable with the arrangement of FIG. 4, the arrangement of FIG. 4 produces the higher brightness with $\hat{I}/\hat{I}_G > 4/3$.

At present, because of the available efficiencies and service lives of the red, green and blue fluorescent materials of CRT elements, the green fluorescent material provides the lowest maximum output while the red and blue fluorescent materials can produce a much greater maximum output. If a control system is employed in which the brightness control for displaying an image including half-tones is carried out using time width control, the linearity of light emission output with beam current may be disregarded. Therefore, the maximum outputs of the CRT elements are determined primarily from the service life factors. Thus, presently available CRT elements can be operated with $K \simeq 2$. Accordingly, a maximum brightness of "white" $\hat{Y}_2 \simeq N\hat{I}_G/2A$ can be produced. That is, the maximum brightness obtainable with the arrangement of FIG. 4 is about 1.5 times that of the arrangement of FIG. 1.

Figure 1:
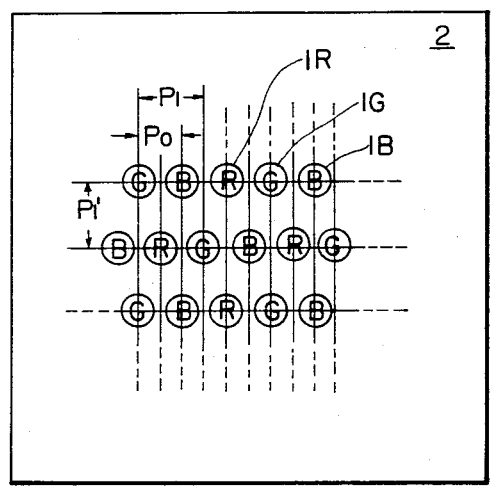
FIG. 1 is an explanatory diagram showing the arrangement of light emitting elements in a conventional color display apparatus.
Figure 2:
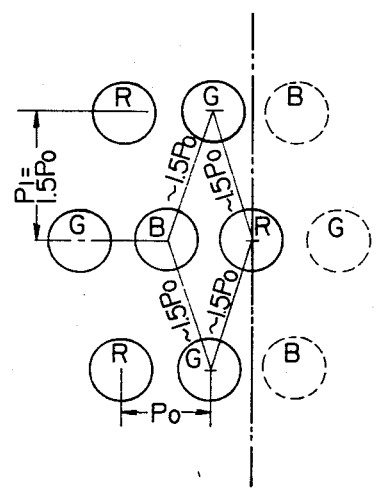
FIG. 2 is an explanatory diagram showing one end of an image displayed on the color display apparatus of FIG. 1.
Figure 3:
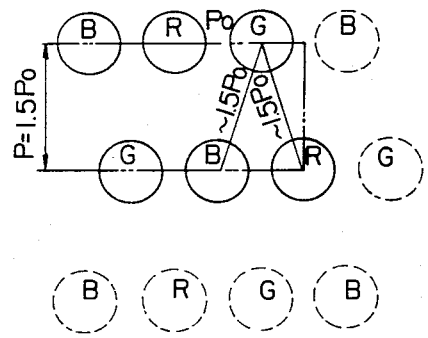
FIG. 3 is an explanatory diagram showing a thin line displayed on the color display apparatus of FIG. 1.

In the case where the total number of CRT elements is limited by the pitch of the CRT elements due to structural limitations, the total number of CRT elements is $N_1 = A/1.5P_0^2$ in the case of FIG. 1 and $N_2 = A/P_0^2$ in the case of FIG. 4. Therefore, the maximum brightness in the arrangement of FIG. 4 is $1.5^2 (=2.25)$ times that of the arrangement of FIG. 1.

Figure 7:
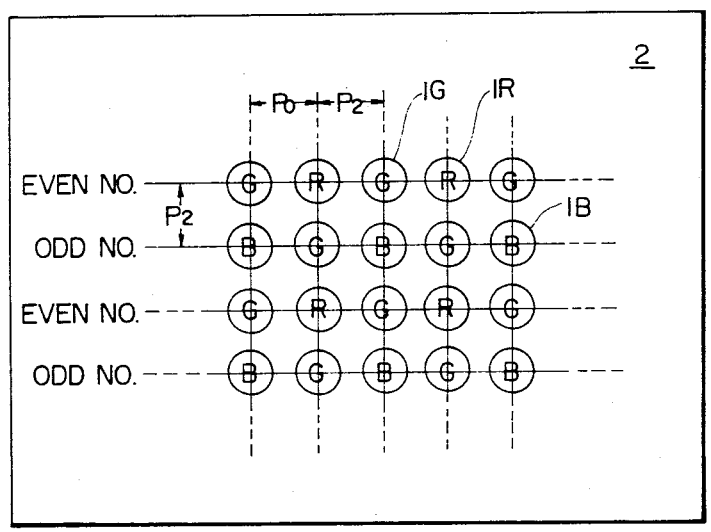
FIG. 7 is an explanatory diagram showing another example of the arrangement of CRT elements according to the invention.

FIG. 7 shows another embodiment of the invention. In FIG. 7, the CRT elements are arranged at a pitch $P_0$. More specifically, the red CRT elements and the green CRT elements are alternately arranged in the order of R, G, R, G, R, . . . in even numbered rows while the green CRT elements and the blue CRT elements are arranged in the order of G, B, G, B, G, . . . in odd numbered rows. Furthermore, the arrangement is such that the green CRT elements and the blue CRT elements in odd numbered rows are immediately below the red CRT elements and the green CRT elements in even numbered rows, respectively. In the case where the green CRT elements in adjacent rows are shifted from one another, the equivalent sampling pitch in the horizontal direction which determines the resolution of the displayed image is the shortest distance between the green elements in the horizontal direction. The equivalent sampling pitch is $P_1 = 1.5P_0$ for FIG. 1, while $P_2 = P_0$ for FIG. 7.

In the arrangement of FIG. 7, it should be noted that control is so effected that the red and blue CRT elements emit light at a brightness twice that of the brightnesses in a conventional apparatus.

The arrangement of the CRT elements as shown in FIG. 7 provides the advantageous effects which will be described by comparison with those of the conventional apparatus of FIG. 1.

(I) Resolution

Because of the structural limitations, the pitch of arrangement of the CRT elements has a lower limit. Let us consider the case where a display surface is constituted by arranging the CRT elements with the lower limit as $P_0$. The equivalent sampling pitch which determines the resolution is $P_1 = 1.5P_0$ for the arrangement of FIG. 1, while it is as small as $P_2 = P_0$ for the arrangement of FIG. 7. That is, the resolution for the arrangement of FIG. 7 is 1.5 times that of the arrangement of FIG. 1.

Let us consider another example, such as the case where the total number of CRT elements is limited because of economical considerations or the like. If the area of the display surface is represented by A, then the total number N of red, green and blue CRT elements is $N = A/(P_0 \times P_1) = 1.5A/P_1^2$ for the arrangement of FIG. 1 while it is $N = A/P_2^2$ for the arrangement of FIG. 7. Accordingly, with the total number of CRT elements being N, the equivalent sampling pitch is $P_1 = 1.5A/N$ for FIG. 1, while $P_2 = A/N$ for FIG. 7. Thus, in this case also, the arrangement of FIG. 7 is superior to that of FIG. 1. The resolution in the arrangement of FIG. 7 is $\sqrt{1.5} (=1.225)$ times that of the arrangement of FIG. 1.

(II) Brightness

By way of example, let us consider the maximum brightness which is obtainable in displaying "white". In the arrangement of FIG. 7, the numbers of red, green and blue CRT elements are N/4, N/2 and N/4, respectively. Therefore, the brightness is;

$$Y_2 = (0.3I_R/4 + 0.59I_G/2 + 0.11I_B/4) \times N/A$$

where "white" can be displayed with $I_R = 2I_G = I_B$.

If the lower in maximum output of $I_R$ and $I_B$ is represented by $\hat{I}$ and the maximum output of $I_G$ is $\hat{I}_G$, then when $\hat{I}<2\hat{I}_G$, the maximum brightness of "white" is determined by $\hat{I}$ such that: $\hat{Y}_2=N\hat{I}/4A$. When $\hat{I}\geq 2\hat{I}_G$, $\hat{Y}_2=N\hat{I}_G/2A$.

As described above, with presently available CRT technology, $\hat{I}_G$ is the lowest in maximum output. Therefore, the maximum brightness of "white" in the arrangement of FIG. 1 is $\hat{Y}_1=N\hat{I}_G/3A$. Thus, when the maximum brightness of "white" in the arrangement of FIG. 1 is compared with those $\hat{Y}_2$ and $\hat{Y}'_2$ obtainable for the arragement of FIG. 7, the arrangement of FIG. 7 produces a higher brightness than that of FIG. 1 in the case of $\hat{I}/\hat{I}_g \geq 1.33$.

As described above, presently available CRT elements can be operated with $\hat{I}/\hat{I}_G \approx 2$. Thus, a maximum brightness of "white" $Y_2 \approx NI_G/2A$ can be expected in the arrangement of FIG. 7. Accordingly, the maximum brightness obtainable with the arrangement of FIG. 7 is about 1.5 times that of the arrangement of FIG. 1.

Futhermore, in the case where the total number of CRT elements is limited by the pitch of the elements due to structural limitations of the elements, the total number of CRT elements (or other type of light emitting elements as the case may be) is $N_1=1.5P_0^2$ for the case of FIG. 1, while $N_2=A/P_0^2$ for the case of FIG. 7. Therefore, the maximum brightness of the arrangement of FIG. 7 is $1.5^2 (=2.25)$ times that of the arrangement of FIG. 1.

For constructing a large screen display apparatus, CRT elements emitting light in three primary colors, red, green and blue, are arranged as shown in FIGS. 4 and 7 according to the invention. As described hereinbefore, a large screen color image display apparatus can be provided according to the invention which has more resolution, better color mixing and higher maximum brightness and is significantly improved in display quality compared with a conventional apparatus.

What is claimed is:

1. A large scaled color display apparatus comprising a color display surface constituted by a plurality of cathode ray tubes (CRTs) each emitting light in one of three primary colors, red, blue and green, wherein said CRTs are arranged in the form of a plurality of lattices with a predetermined distance between CRTs adjacent to one another and any four of said CRTs form a lattice square pattern having two diagonals with two green light CRTs being positioned at corners on one of the diagonals of said lattice square pattern and with a red CRT and a blue CRT being positioned at the remaining corners on another diagonal, respectively.

2. The large scaled color display apparatus as defined in claim 1 wherein said pattern is repeated so that said green CRTs are positioned on diagonals in a vertical direction in some patterns and in a horizontal direction in other patterns, and said red and blue CRTs are positioned on diagonals other than those on which said green CRTs are positioned, whereby said red and blue CRTs are arranged alternately in both the vertical and horizontal directions.

3. The large scaled color display apparatus as defined in claim 1 wherein said pattern is repeated and said two diagonals are inclined with said green CRTs positioned at corners on one of the inclined diagonals whereas said red and blue CRTs are positioned at the remaining corners on another inclined diagonals whereby said red and blue CRTs are arranged alternately in said color display surface, and wherein the pitch between said adjacent CRTs in the horizontal direction is approximately equal to that in the vertical direction.

* * * * *